United States Patent
Craske et al.

(10) Patent No.: US 9,501,667 B2
(45) Date of Patent: Nov. 22, 2016

(54) SECURITY DOMAIN PREDICTION

(71) Applicant: ARM Limited, Cambridge (GB)

(72) Inventors: Simon John Craske, Cambridge (GB); Thomas Christopher Grocutt, Cambridge (GB)

(73) Assignee: ARM Limited, Cambridge (GB)

( * ) Notice: Subject to any disclaimer, the term of this patent is extended or adjusted under 35 U.S.C. 154(b) by 148 days.

(21) Appl. No.: 14/310,332

(22) Filed: Jun. 20, 2014

(65) Prior Publication Data
US 2015/0371017 A1 Dec. 24, 2015

(51) Int. Cl.
| | | |
|---|---|---|
| G06F 9/38 | (2006.01) | |
| G06F 7/04 | (2006.01) | |
| G06F 17/30 | (2006.01) | |
| H04N 7/16 | (2011.01) | |
| G06F 21/79 | (2013.01) | |
| G06F 21/55 | (2013.01) | |

(52) U.S. Cl.
CPC .............. *G06F 21/79* (2013.01); *G06F 9/3806* (2013.01); *G06F 21/554* (2013.01); *G06F 2221/2141* (2013.01); *G06F 2221/2149* (2013.01)

(58) Field of Classification Search
CPC ........ G06F 21/57; G06F 21/74; G06F 21/86; G06F 21/71; G06F 12/1491; G06F 9/3806; G06F 12/0875; G06F 9/3844; G06F 21/2141; G06F 21/2149
USPC .................. 711/E12.091, E12.093, E12.097; 713/166, 194; 26/1, 21, 26; 712/E9.047, 237, 238, 239; 726/21, 26
See application file for complete search history.

(56) References Cited

U.S. PATENT DOCUMENTS

| | | | |
|---|---|---|---|
| 5,956,753 A | 9/1999 | Glew et al. | |
| 7,103,914 B2 * | 9/2006 | Focke | G06F 9/45537 703/20 |
| 7,496,769 B2 * | 2/2009 | Lampson | G06Q 10/10 705/51 |
| 8,090,934 B2 * | 1/2012 | Koc | G06F 9/3806 712/238 |
| 8,122,222 B2 * | 2/2012 | Nicholas | G06F 12/0862 711/204 |
| 8,200,774 B1 * | 6/2012 | Redstone | G06F 9/526 707/704 |
| 2010/0325395 A1 | 12/2010 | Burger et al. | |

FOREIGN PATENT DOCUMENTS

| | | |
|---|---|---|
| WO | WO 98/12635 | 3/1998 |
| WO | WO 2013/126852 | 8/2013 |

OTHER PUBLICATIONS

GB Combined Search and Examination Report issued Oct. 14, 2015 in GB 1506904.0, 2 pages.

* cited by examiner

*Primary Examiner* — Saleh Najjar
*Assistant Examiner* — Feliciano Mejia
(74) *Attorney, Agent, or Firm* — Nixon & Vanderhye P.C.

(57) ABSTRACT

A data processing apparatus supports operation in both a secure domain and a less secure domain. The secure domain has access to data that is not accessible when operating the less secure domain. Prediction circuitry generates a domain prediction indicating whether a given processing action (such as a memory access) is to be performed in association with the secure domain or with the less secure domain. In this way, an appropriate set of memory permission data for controlling access by different privilege levels in the domains may be selected and applied by an appropriate memory protection unit. If the domain prediction is incorrect, then the processing is stalled and the given processing action retried.

21 Claims, 6 Drawing Sheets

SECURITY DOMAIN PREDICTION

BACKGROUND

This invention relates to the field of data processing systems. More particularly, this invention relates to data processing systems including multiple security domains, such as a secure domain and a less secure domain.

It is known to provide data processing systems, such as those implementing the TrustZone features of processors designed by ARM Limited of Cambridge, England. Within such systems a secure domain may be provided for handling processing involving sensitive data, such as cryptographic keys, financial data etc, with a less secure domain being provided for routine processing tasks, such as management of the user interface, media processing etc. The different domains have access to different resources, with the secure domain having access to at least some resources which are not accessible to the less secure domain or less secure domains. Within the domains themselves, there may be provided multiple privilege levels, such as a supervisor privilege level for executing an operating system and a user privilege level for executing application programs.

SUMMARY

Viewed from one aspect the present technique provides a data processing apparatus comprising:

processing circuitry configured to perform data processing operations in response to program instructions, said processing circuitry having a plurality of domains of operation including a secure domain and a less secure domain, wherein when operating in said secure domain said processing circuitry has access to data that is not accessible when operating in said less secure domain; and prediction circuitry coupled to said processing circuitry and configured to generate a domain prediction predicting whether a given processing action to be performed by said processing circuitry should be performed associated with said secure domain or associated with said less secure domain, wherein said processing circuitry performs said given processing action based upon said domain prediction.

The present technique recognises that a processing bottleneck may arise when there is a requirement for a domain of operation to be known before a given processing action can be performed. The present technique addresses this issue by generating a domain prediction concerning for which security domain a given processing action should be performed and then performing that given processing action based upon the domain prediction.

In at least some embodiments, within at least one of the domains there are provided a plurality of privilege levels with the different privilege levels having different access permissions, e.g. one of the domains is subdivided by privilege levels using access permission for different areas of that memory address space depending upon the current privilege level. The privilege level division can be considered as a division orthogonal to the division between domain.

At least some embodiments include memory permission control circuitry which uses either secure domain memory permission data or less secure memory domain permission data as part of an access control action to control access to memory. In this context, the given processing action which is performed in dependence upon the predicted domain is an access control action which is performed using either the secure domain memory permission data or the less secure memory domain permission data based upon the predicted domain as predicted by the prediction circuitry.

The memory permission control circuitry may serve to provide different access permissions for the first privilege level and the second privilege level. The memory permission control circuitry could, for example, take the form of a memory management unit using page table data stored within the memory address space. In other embodiments the memory permission control circuitry comprises memory protection unit circuitry serving to manage access to the memory based upon the secure domain memory permission data and the less secure domain memory permission data which each specify a plurality of different memory regions within the memory address space. In some embodiments, each of these regions having at least one associated memory access attribute. The memory protection unit circuitry compares an address of a memory access against the address ranges of the different regions to determine which of the associated memory access attributes to apply to that memory access. In some embodiments, the presence or absence of a memory region may comprise part or all of the attribute data.

In such embodiments, the memory protection unit circuitry needs to use either the secure domain memory permission data or the less secure domain memory permission data in dependence upon whether the address being associated with the secure domain or the less secure domain. As the system can switch between the secure domain and the less secure domain at a fine grained level, the selection of which permission data to use based upon the domain associated with the address can become a critical path issue. In this context, the use of a domain prediction enables critical path requirements to be eased at the cost of recovery from an occasional misprediction.

Some embodiments include domain attribute circuitry using domain attribute data to perform a domain indicating action to generate a domain indicator indicating whether a memory access operation is associated with the secure domain or the less secure domain. The domain attribute circuitry will take a finite time to perform this determination and generate the domain indicator and accordingly the use of the domain prediction ahead of the domain indicator become available can ease timing constraints.

In some embodiments the domain attribute data may specify a plurality of different domain memory regions within the memory address space. In some example embodiments, each of these different domain memory regions may have at least one associated domain attribute. The domain attribute circuitry may compare an address of a memory access against the addresses of the different domain memory regions to determine which of the domain attributes to apply. The domain attribute may, for example, be a simple indication of whether the memory address is one associated with the secure domain or the less secure domain. In other embodiments the presence or absence of a domain memory region may be itself used as the associated domain attribute.

In some embodiments, prediction comparison circuitry may be provided to compare the domain prediction with the domain indicator and if there is not a match then to trigger a retry action in which the processing circuitry performs again the given processing action (which was initially performed based on an incorrect domain prediction) based upon the domain indicator.

In some embodiments the results of the given processing action before the retry action may be discarded and result(s) of the given processing action from the retry action used in their place.

The processing circuitry may be stalled at least in respect of progressing the memory access operation. During the retry action in order to provide sufficient time for the retry action to be completed.

In some embodiments the memory access operation may be an instruction fetch operation. Fetching instructions may be a security sensitive operation, as it can permit execution of secure code which would reveal secret information. Accordingly, the control of the fetch of instructions is one well suited to systems employing a secure domain and a less secure domain. It is desirable that such systems should have high performance and this may be assisted by the use of a domain prediction in at least some example embodiments.

The domain attribute circuitry discussed previously may be configured to perform its domain indicating action in parallel with the access control action performed by the memory permission control circuitry. Performing these two actions in parallel eases timing constraints and may permit higher performance.

It will be appreciated that the prediction circuitry may serve to generate its prediction in a variety of different ways. One simple form of prediction is that the domain prediction should be the same as the current domain in which the system is operating. Another form of prediction which may be used in other embodiments is that the domain prediction is the domain which was previously associated with the given processing action which is to be performed.

While it will be understood that the secure domain and the less secure domain may contain different numbers of privilege levels, in some embodiments, each of the secure domain and the less secure domains contains a plurality of privilege levels. This enables flexibility in the control of processing performed on either side of the domain boundary and also enables calling between different privilege levels on different sides of the domain boundary to be supported as appropriate.

Viewed from another aspect the present invention provides a data processing apparatus comprising:

processing means for performing data processing operations in response to program instructions, said processing means having a plurality of domains of operation including a secure domain and a less secure domain, wherein when operating in said secure domain said processing means has access to data that is not accessible when operating in said less secure domain; and prediction means, coupled to said processing means, for generating a domain prediction predicting whether a given processing action to be performed by said processing means should be performed associated with said secure domain or associated with said less secure domain, wherein said processing means performs said given processing action based upon said domain prediction.

Viewed from a further aspect the present invention provides a method of processing data comprising the steps of:

performing data processing operations using processing circuitry in response to program instructions, said processing circuitry having a plurality of domains of operation including a secure domain and a less secure domain, wherein when operating in said secure domain said processing circuitry has access to data that is not accessible when operating in said less secure domain;

generating a domain prediction predicting whether a given processing action to be performed by said processing means should be performed associated with said secure domain or associated with said less secure domain; and performing said given processing action based upon said domain prediction.

The above, and other objects, features and advantages of this invention will be apparent from the following detailed description of illustrative embodiments, which is to be read in connection with the accompanying drawings.

DESCRIPTION OF EXAMPLE EMBODIMENTS

Figure 1:
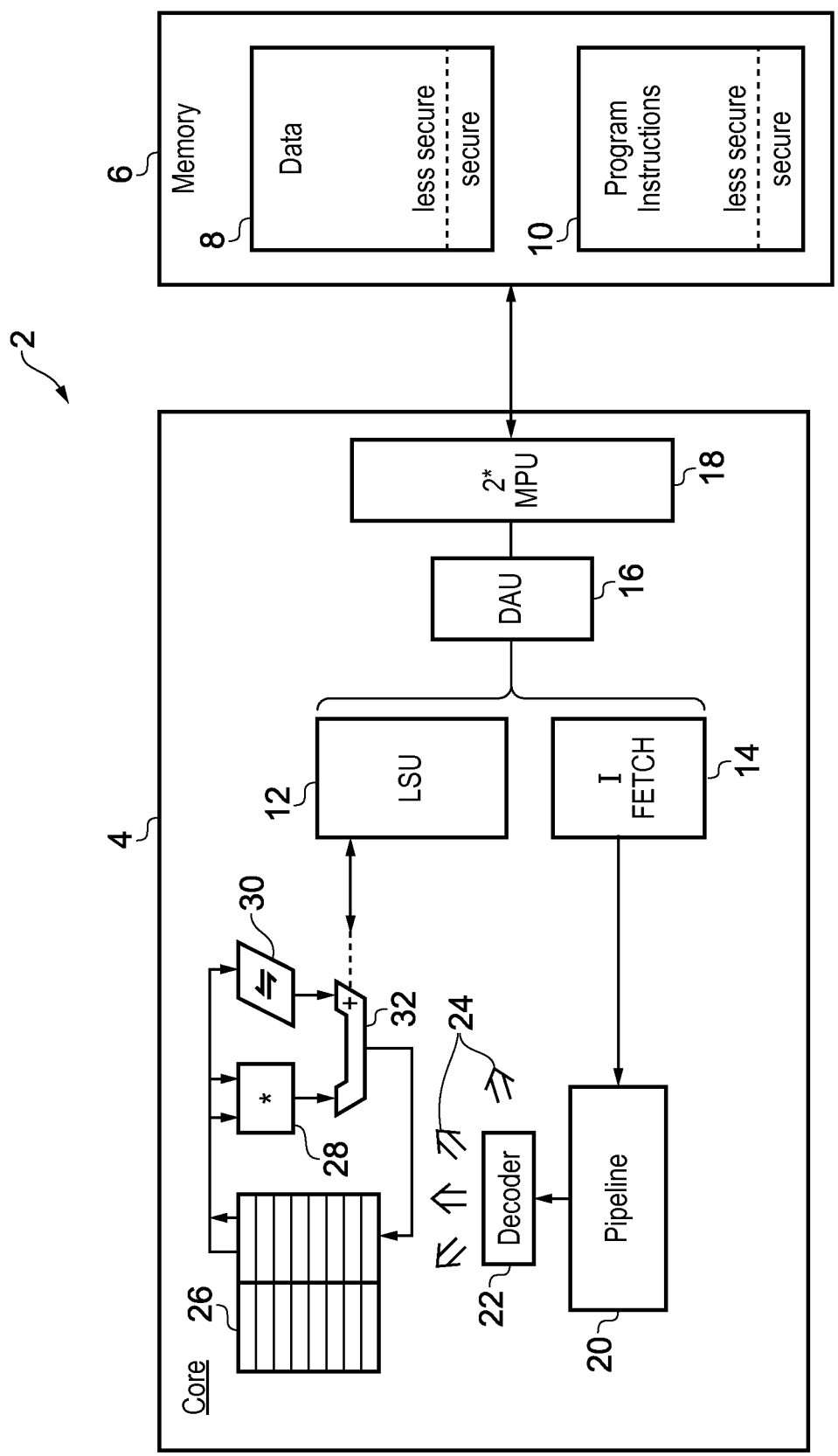
FIG. 1 schematically illustrates a data processing apparatus supporting both a secure domain and a less secure domain of program instruction execution.

FIG. 1 schematically illustrates a data processing apparatus 2 including a processor core 4 and a memory 6. The memory 6 stores both data 8 to be manipulated and program instructions 10 to be executed as a sequence of program instructions (in both secure forms and less secure forms). The processor core 4 uses a load store unit 12 and an instruction fetch unit 14 to read and write data 8 and to fetch program instructions 10 to be executed. The data processing apparatus 2 supports two domains of operation, namely a secure domain and a less secure domain. It will be appreciated that more than two domains may be supported in other embodiments.

A domain attribute unit 16 serves to store domain attribute data which specifies which memory addresses are associated with which domain. The secure domain has access to at least some data that is not accessible when operating in a less secure domain. Such data may be, for example, cryptographic keys, cryptographic algorithms, financial data and other sensitive data. The domains provide a different execution environment for the execution of secure/sensitive programs using secure data as opposed to more routine processing which can occur within the less secure domain. The data processing apparatus 2 has state which places it either in the secure domain or the less secure domain. Each of these domains may include one or more privilege levels orthogonal to the domains, such as a supervisor level and a user level. These different privilege levels may have different memory attributes associated with different regions of the memory address space.

The data processing apparatus 2 includes two memory protection units which are respectively responsive to secure domain permission data and less secure domain permission data and together provide what may be considered to be the memory permission control circuitry 18 of a system. These two memory protection units serve to police the memory attributes to be applied at the different privilege levels within a domain. The domain attribute unit 16 serves to police in which domain the data processing apparatus 2 must be in order to access certain memory addresses irrespective of and independent of the privilege level.

Instructions fetched by the instruction fetch unit 14 are supplied to a processing pipeline 20 from which they are decoded by a decoder 22 to generate control signals 24 for controlling processing circuitry including the load store unit 12 and a data processing path comprising a register bank 26, a multiplier 28, a shifter 30 and an adder 32. It will be understood that in practice the processor core 4 will typically include many further processing elements (omitted here for clarity).

Figure 2:
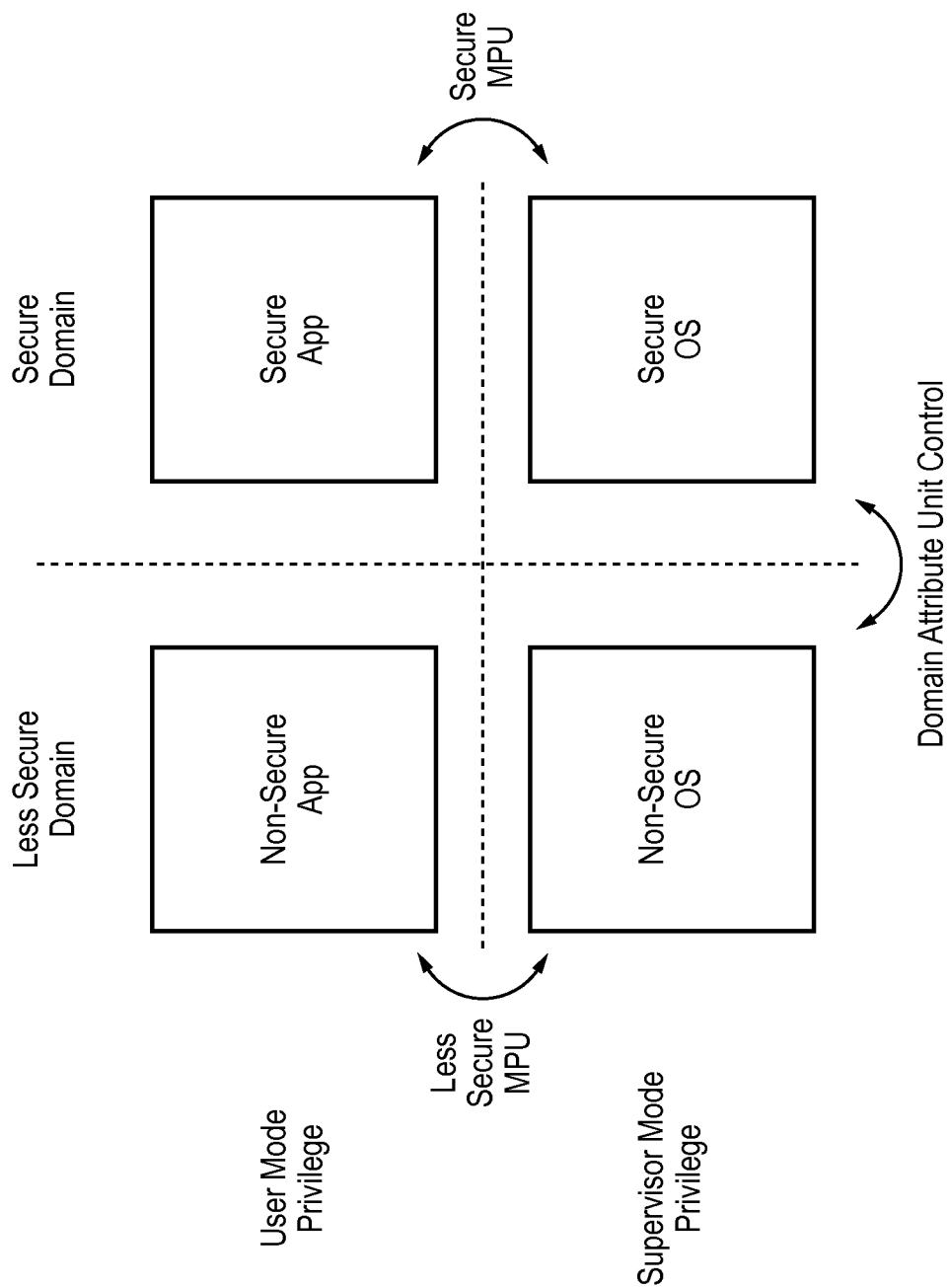
FIG. 2 schematically illustrates the relationship between the less secure domain, the secure domain and different privilege levels within those two domains.

FIG. 2 schematically illustrates different states which the data processing apparatus 2 may adopt. Firstly, there are illustrated both a secure domain and a less secure domain. Changing between these domains is controlled by the domain attribute unit 16 and an entry point instruction 92. Within each domain there is, at least in this example embodiment, both a user mode privilege level and a supervisor mode privilege level. When the data processing apparatus 2 is in the less secure domain, memory access for data accesses is controlled by the less secure memory protection unit. When operating in the secure domain, memory access for data accesses is controlled by the secure memory protection unit. Switching between privilege levels is controlled by an SVC (supervisor call) exception instruction It will be appreciated that the different memory protection units may in practice share circuitry, e.g. as only one of these memory protection units is accessed at a given time, then they may share their comparators in a manner which reduces power consumption overhead and circuit area overhead.

Figure 3:
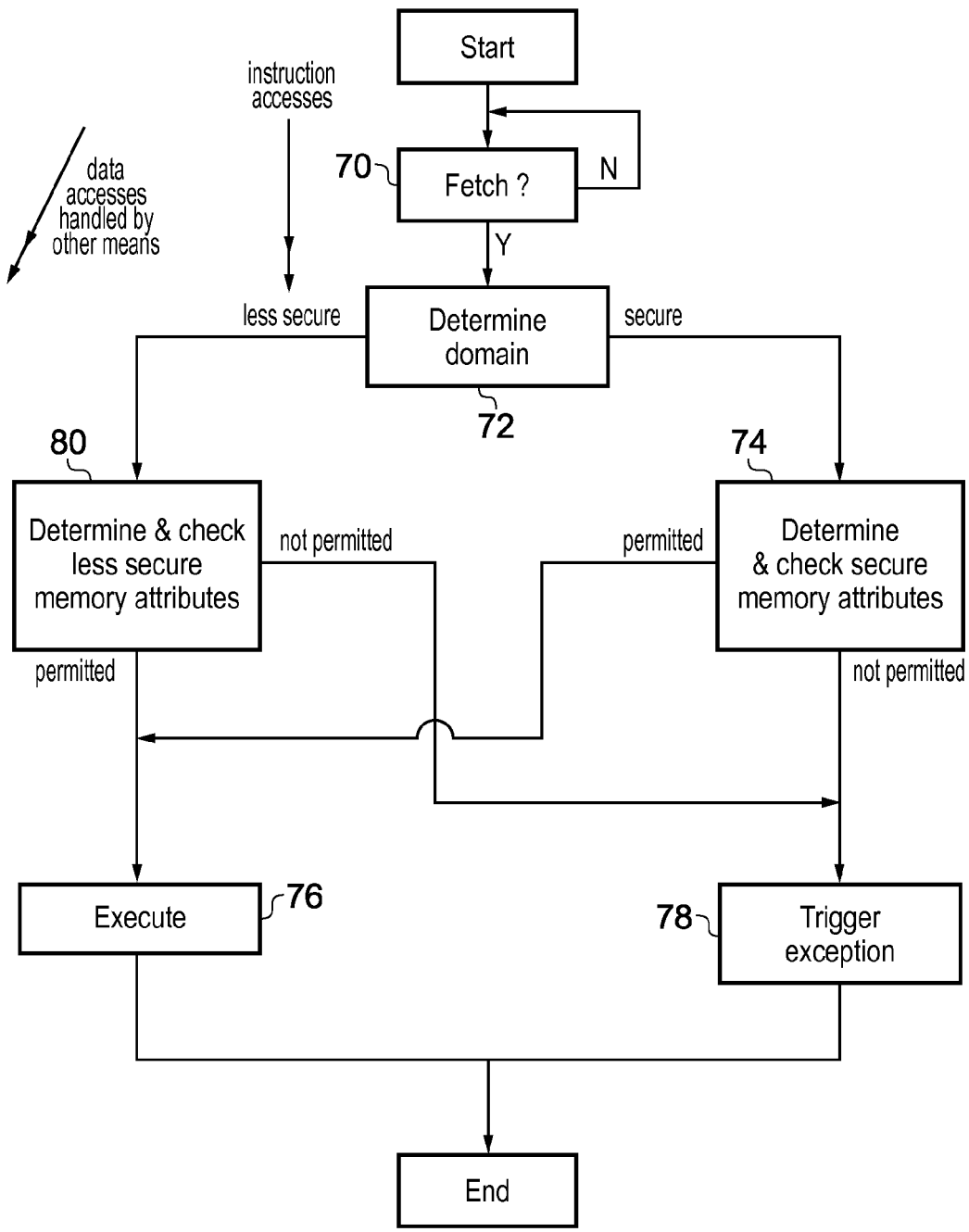
FIG. 3 is a flow diagram schematically illustrating the control of memory accesses in a system containing multiple domains and multiple privilege levels within those domains.

FIG. 3 is a flow diagram schematically illustrating the overall set of determinations to be performed for an instruction fetch. At step 70 processing waits until there is an instruction fetch to be performed. Data accesses are handled by a different mechanism. Step 72 then determines the domain to be applied to that instruction fetch, namely the less secure domain or the secure domain. If the secure domain is selected, then the step 74 determines and checks the secure memory attributes for the memory access to determine whether or not the memory access is permitted or not permitted. If the memory access is permitted, then step 76 executes the memory access. If the memory access is not permitted, then step 78 triggers an exception.

If the determination at step 72 is that the less secure domain is selected, then step 80 determines and checks the less secure memory attributes for the memory access. If the memory access is not permitted, then step 78 triggers an exception. If the memory access is permitted, then step 76 executes the memory access.

Figure 4:
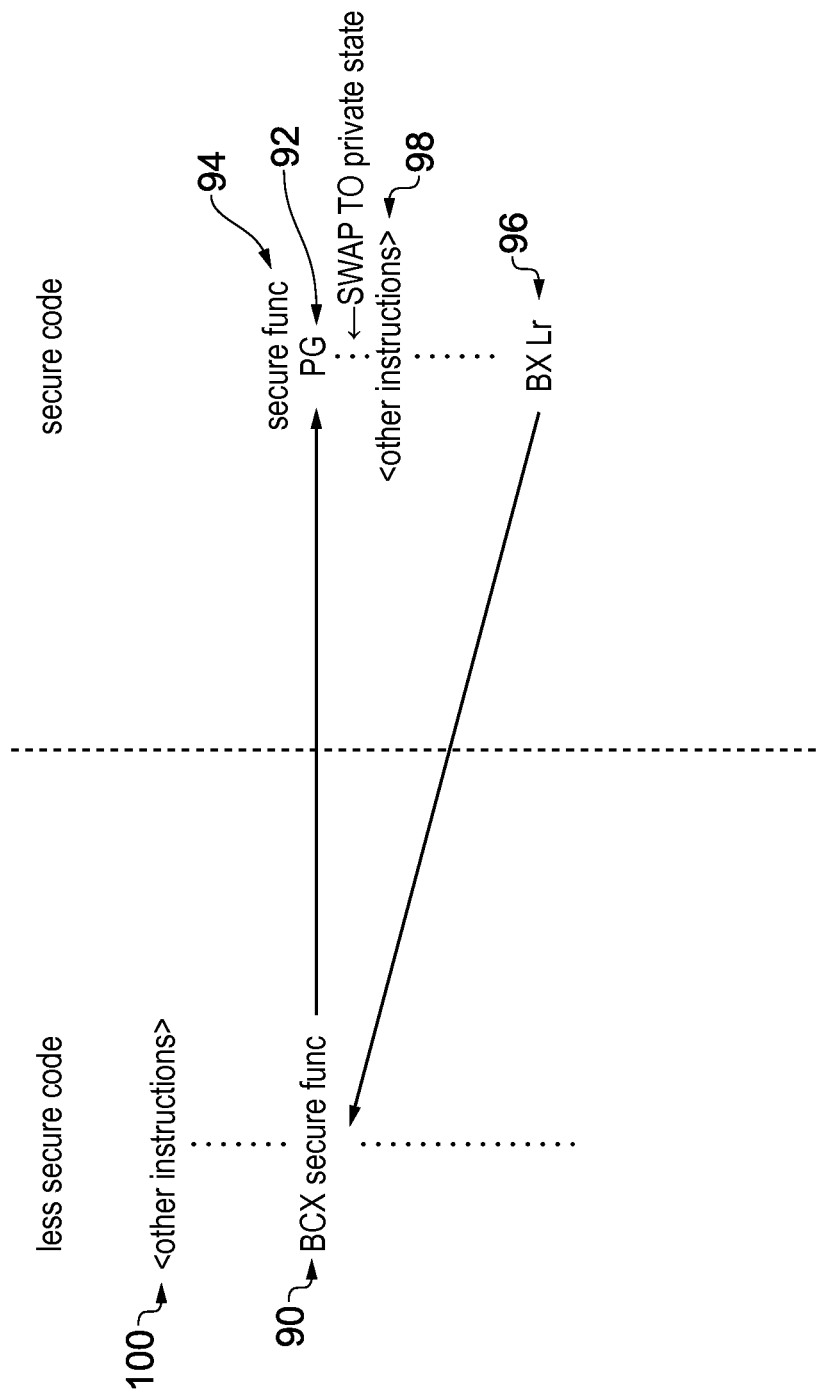
FIG. 4 is a diagram showing a function call from the less secure domain to the secure domain.

FIG. 4 is a diagram showing a function call from the less secure domain to the secure domain. Program flow in the less secure domain 100 encounters a BLX instruction 90 that calls a function 94 in memory associated with the secure domain. This causes the program flow to alter and execution to restart at the entry point program instruction 92. The execution of this program instruction causes the processing circuitry to switch processing of the remaining program instructions 98 in the function to the secure domain. Since the entry point program instruction 92 causes the domain switch, the entry point program instruction itself is executed in the less secure domain. However, since it is part of a secure function in memory associated with the secure domain, the secure memory protection data 34 (see FIG. 5) is used by the MPU 18 when validating the memory access that fetched the entry point program instruction 92. Once the remaining program instructions 98 in the secure function 94 have been executed, the BX program instruction 96 returns the program flow back to the less secure domain.

Figure 5:
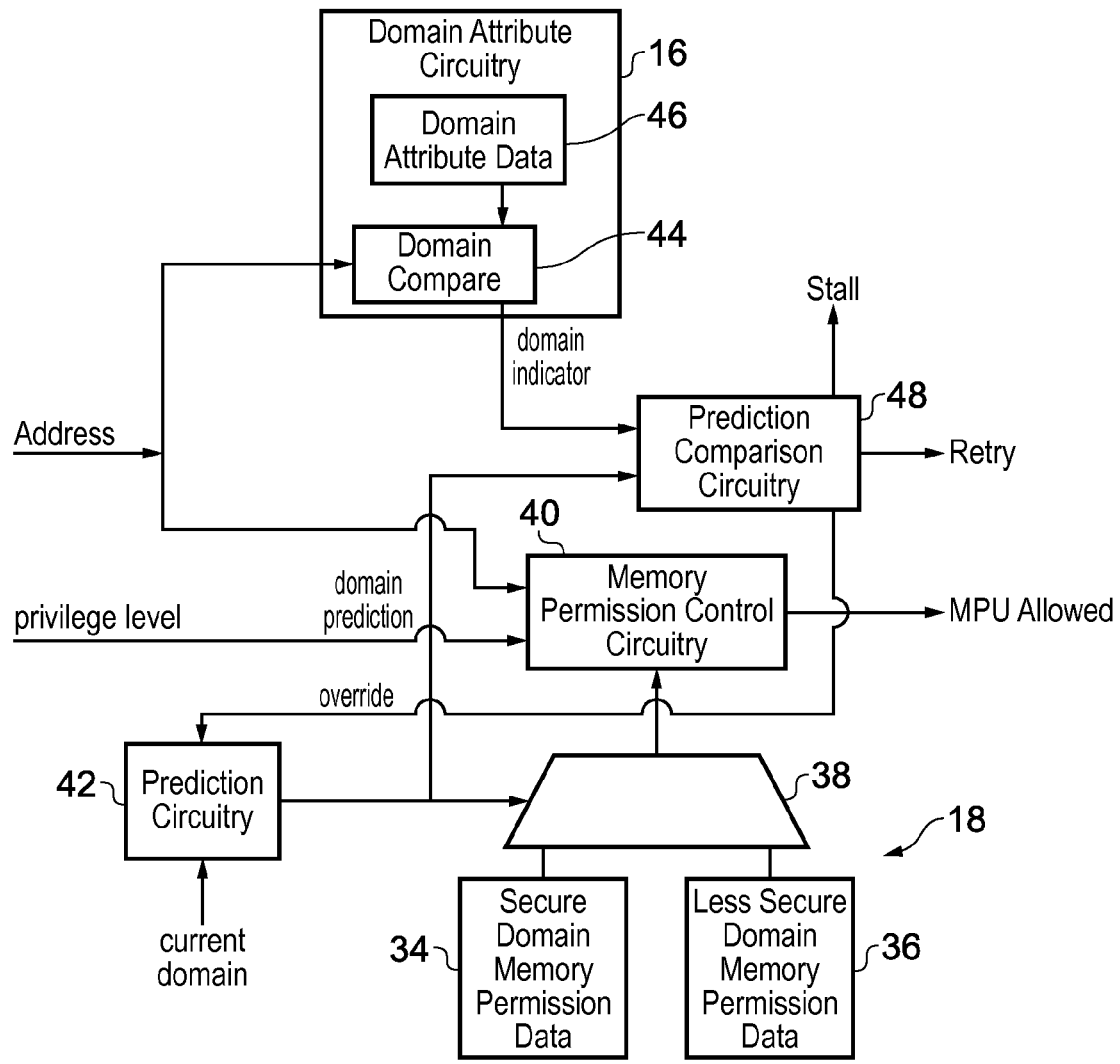
FIG. 5 is a diagram schematically illustrating the use of a domain prediction in selecting which memory permission data is to be used to determine whether or not a memory access to a given memory address is permitted.

FIG. 5 schematically illustrates the domain attribute circuitry 16 and the memory permission control circuitry 18 in more detail. The memory permission control circuitry 18 uses either secure domain memory permission data 34 or less secure domain memory permission data 36 as selected by a multiplexer 38 and supplied to memory permission control circuitry comparators 40. Prediction circuitry 42 generates a domain prediction which switches the multiplexer 38 to select one of the sets of memory permission data 34, 36 for use by the comparators 40. The comparators 40 use memory permission data in association with an address of a memory access to be checked and the current privilege level.

The memory permission data specifies different regions within the memory address space and memory attributes associated with those different regions. The comparators 40 determine from the memory address to be checked, in which region that memory address lies. When the region has been identified, the appropriate memory attributes may be read and a determination made as to whether or not the memory access concerned is permitted and an MPU Allowed signal generated to indicate this result. If a memory access fails its MPU check, then an exception will be triggered, as will be familiar to those in this technical field.

In parallel with the action of the memory permission control circuitry 18, the domain attribute circuitry 16 uses the memory address of the candidate memory access to perform a domain compare operation using domain comparators 44 configured by the domain attribute data 46 to determine in which of a plurality of regions of the memory address space the memory address candidate falls. In some example embodiments if the address matches any of the domain memory regions programmed in the domain attribute circuitry 16, then the address is in the less secure domain, otherwise the address is in the secure domain. In other example embodiments different domain memory regions may have at least one associated domain attribute specified within the domain attribute data 46. This domain attribute may include an indication of whether or not the memory address concerned is associated with either the secure domain or the less secure domain. Accordingly, the domain comparator 44 generates a domain indicator signal based upon the lookup of the appropriate domain with respect to the domain memory regions and the domain attribute data.

Prediction comparison circuitry 48 serves to compare the domain prediction from the prediction circuitry 42, which was supplied to select the memory permission data 34, 36, against the actual domain indicator determined in parallel with the memory permission control circuitry activity. If the domain prediction does not match the domain indicator, then this indicates a misprediction and retry signal is generated. The prediction compare circuitry at the same time generates a stall signal which stalls the processor core 4 while the memory access checking by the circuitry of FIG. 3 is rerun based upon the actual domain indication carried by the override signal so that the correct one of the memory permission data 34, 36 will be applied by the memory permission control circuitry 18. The results of the memory permission check operation based upon the misprediction (the results of the given processing action before the retry action) are discarded and are replaced by the results of the memory permission check (given processing action) that result from the retry action. The processor 14 is thus stalled for a short period when a misprediction arises.

The prediction circuitry 42 makes its prediction based upon the current domain in which the data processing apparatus 2 is operating. This prediction may in other embodiments be made in different ways, such as by basing the prediction based upon the domain which was used the previous time the given processing action concerned was performed. It will be appreciated by those in this field that other prediction techniques/algorithms could be employed for the generation of the domain prediction associated with different types of processing action which are to be performed dependent upon (or at least in association with) the domain concerned.

Figure 6:
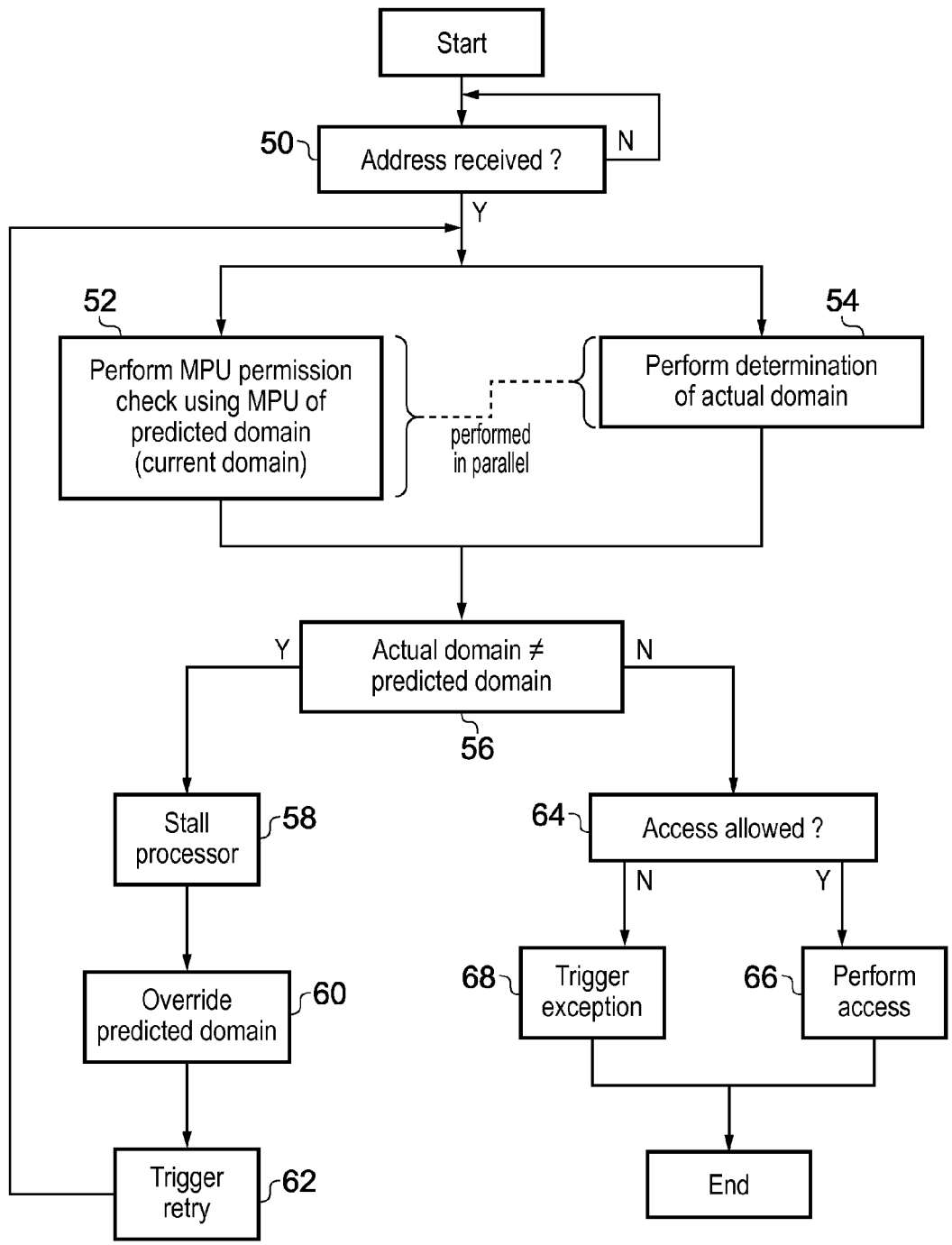
FIG. 6 is a flow diagram schematically illustrating the action of the circuitry of FIG. 3.

FIG. 6 is a flow diagram schematically illustrating the operation of the circuitry of FIG. 3. At step 50 processing waits until a memory address is received. When a memory address is received, then steps 52 and 54 are performed in parallel before processing passes to step 56. At step 52 a memory protection unit permission check is performed using the memory protection unit of the predicted domain (current domain). The memory protection unit of the predicted domain is effectively formed by the shared comparators within the memory permission control circuitry 40 and the appropriately selected one of the sets of memory permission data 34, 36. Step 54 performs a determination of the actual one of the secure domain or the less secure domain which should be applied for the memory address which has been received. This determination is performed by the domain attribute circuitry 16 and results in the generation of the actual domain indicator.

At step 56 a determination is made as to whether or not the actual domain indicated by the domain indicator does not equal the predicted domain. If there is a mismatch, then step 58 stalls the data processing apparatus 2, step 60 overrides the prediction signal as generated by the prediction circuitry 42 with the actual domain indication, and then step 62 triggers a retry of the memory access permission checking by returning processing starting from the parallel steps 52, 54.

If the determination at step 56 is that there is not a mismatch, then step 64 determines whether or not the access is actually indicated as allowed by the memory permission control circuitry 18. If the access is allowed, then step 66 performs the access. If the access is not allowed, then step 68 triggers an exception, e.g. a memory abort.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   processing circuitry configured to perform data processing operations in response to program instructions, said processing circuitry having a plurality of domains of operation including a secure domain and a less secure domain, wherein when operating in said secure domain said processing circuitry has access to data that is not accessible when operating in said less secure domain; and
   prediction circuitry coupled to said processing circuitry and configured to generate a domain prediction predicting whether a given processing action to be performed by said processing circuitry should be performed associated with said secure domain or associated with said less secure domain, wherein said processing circuitry performs said given processing action based upon said domain prediction.

2. Apparatus as claimed in claim 1, wherein at least one of said secure domain and said less secure domain has a plurality of privilege levels including a first privilege level and a second privilege level, wherein when operating in said first privilege level said processing circuitry has access permissions different from said second privilege level.

3. Apparatus as claimed in claim 2, comprising memory permission control circuitry configured to use either secure domain memory permission data or less secure domain memory permission data as part of an access control action to control access to a memory and wherein said given processing action is said access control action and said domain prediction controls whether said secure memory permission data or said less secure memory permission data is used by said access control action.

4. Apparatus as claimed in claim 3, wherein said memory permission control circuitry is configured to provide different access permissions for said first privilege level and said second privilege level.

5. Apparatus as claimed in claim 3, wherein said memory permission control circuitry comprises memory protection unit circuitry configured to manage access to said memory based upon said secure domain memory permission data and said less secure domain memory permission data each specifying a plurality of different memory regions within a memory address space of said memory.

6. Apparatus as claimed in claim 5, wherein each of said plurality of different memory regions has at least one associated memory access attribute, and said memory protection unit circuitry is configured to compare an address of a memory access against addresses of said plurality of different memory regions to determine which said at least one associated memory access attribute to apply.

7. Apparatus as claimed in claim 1, comprising domain attribute circuitry configured to use domain attribute data to perform a domain indicating action to generate a domain indicator indicating whether a memory access operation is associated with said secure domain or said less secure domain.

8. Apparatus as claimed in claim 7, wherein said domain attribute data specifies a plurality of different domain memory regions within a memory address space of said memory.

9. Apparatus as claimed in claim 8, wherein each of said plurality of different domain memory regions has at least one associated domain attribute, wherein said domain attribute circuitry is configured to compare an address of a memory access against addresses of said plurality of different domain memory regions to determine which said at least one associated domain attribute to apply.

10. Apparatus as claimed in claim 7, wherein comprising prediction comparison circuitry configured to compare said domain prediction with said domain indicator and, if said domain prediction does not match said domain indicator, then to trigger a retry action of said processing circuitry performing said given processing action again based upon said domain indicator.

11. Apparatus as claimed in claim 10, wherein results of said given processing action before said retry action are discarded and results of said given processing action resulting from said retry action are used instead.

12. Apparatus as claimed in claim 10, wherein said processing circuitry stalls the progress of said memory access during said retry action.

13. Apparatus as claimed in claim 7, wherein said memory access operation is an instruction fetch operation.

14. Apparatus as claimed in claim 3, comprising domain attribute circuitry configured to use domain attribute data to perform a domain indicating action to generate a domain indicator indicating whether a memory access operation is associated with said secure domain or said less secure domain, wherein said access control action is performed in parallel with said domain indicating action.

15. Apparatus as claimed in claim 1, wherein said prediction circuitry is configured to generate said domain prediction to be a current one of said plurality of domains of operation of said processing circuitry.

16. Apparatus as claimed in claim 1, wherein said prediction circuitry is configured to generate said domain prediction to be a previous one of said plurality of domains of operation of said processing circuitry associated with said given processing action.

17. Apparatus as claimed in claim 2, wherein said secure domain and said less secure domain both have a plurality of privilege levels.

18. A data processing apparatus comprising:
  means for performing data processing operations in response to program instructions, said means for performing data processing operations having a plurality of domains of operation including a secure domain and a less secure domain, wherein when operating in said secure domain said means for performing data processing operations has access to data that is not accessible when operating in said less secure domain; and
  means for generating a domain prediction, coupled to said means for performing data processing operations, for predicting whether a given processing action to be performed by said means for performing data processing operations should be performed associated with said secure domain or associated with said less secure domain, wherein
  said means for performing data processing operations being configured to perform said given processing action based upon said domain prediction.

19. A data processing apparatus as claimed in claim 18, wherein at least one of said secure domain and said less secure domain has a plurality of privilege levels including a first privilege level and a second privilege level, wherein when operating in said first privilege level said processing circuitry has access permissions different from said second privilege level.

20. A method of processing data comprising the steps of:
  performing data processing operations using processing circuitry in response to program instructions, said processing circuitry having a plurality of domains of operation including a secure domain and a less secure domain, wherein when operating in said secure domain said processing circuitry has access to data that is not accessible when operating in said less secure domain;
  generating a domain prediction predicting whether a given processing action to be performed by said processing means should be performed associated with said secure domain or associated with said less secure domain; and
  performing said given processing action based upon said domain prediction.

21. A method of processing data as claimed in claim 19, wherein at least one of said secure domain and said less secure domain has a plurality of privilege levels including a first privilege level and a second privilege level, wherein when operating in said first privilege level said processing circuitry has access permissions different from said second privilege level.

* * * * *